(12) United States Patent
Ochiai

(10) Patent No.: US 7,227,640 B2
(45) Date of Patent: Jun. 5, 2007

(54) PHOTOELECTRIC SENSOR

(75) Inventor: Takayuki Ochiai, Kasugai (JP)

(73) Assignee: Sunx Limited, Aichi (JP)

( * ) Notice: Subject to any disclaimer, the term of this patent is extended or adjusted under 35 U.S.C. 154(b) by 274 days.

(21) Appl. No.: 11/032,205

(22) Filed: Jan. 11, 2005

(65) Prior Publication Data

US 2005/0213110 A1  Sep. 29, 2005

(30) Foreign Application Priority Data

Mar. 23, 2004 (JP) .............................. 2004-085293

(51) Int. Cl.
| G01J 3/46 | (2006.01) |
| G01N 21/25 | (2006.01) |
| G01N 21/47 | (2006.01) |
| G06K 7/10 | (2006.01) |
| G06K 7/12 | (2006.01) |

(52) U.S. Cl. ...................... 356/425; 356/402; 356/406; 356/446; 250/226; 235/455; 235/469

(58) Field of Classification Search .............. 356/406, 356/407, 425, 405, 402; 250/226, 559.4, 250/559.44; 235/455, 462.04, 462.06, 469
See application file for complete search history.

(56) References Cited

U.S. PATENT DOCUMENTS 4,603,976 A * 8/1986 Fetzer et al. ................. 356/402
6,094,272 A * 7/2000 Okamoto ..................... 356/402
6,124,936 A * 9/2000 Okamoto ..................... 356/406

FOREIGN PATENT DOCUMENTS

| EP | 0984275 A2 | 3/2000 |
| EP | 0992771 | 4/2000 |
| EP | 0994334 | 4/2000 |
| JP | 2-173532 | 7/1990 |
| JP | 9-178562 | 7/1997 |
| JP | 10-142059 | 5/1998 |
| JP | 11-14459 | 1/1999 |

* cited by examiner

Primary Examiner—Akm Enayet Ullah
Assistant Examiner—Tara S. Pajoohi
(74) Attorney, Agent, or Firm—Wenderoth Lind & Ponack, L.L.P.

(57) ABSTRACT

A photoelectric sensor includes a light-emitting element and a light-receiving element and detects a mark on an object. Prior to the detection of the mark, a reference received light quantity level is sampled for the surface of an object not including the mark, for every color of light. A mark received light quantity level is then sampled for every color of light. The difference is obtained between the reference received light quantity level and the corresponding mark received light quantity level for each color of light. A ratio of the obtained difference to the reference received light quantity level is obtained. For the colors of light where the difference equals or exceeds a predetermined value, the color of light having the largest ratio is selected for emission from the light-emitting element in the detection of the mark.

14 Claims, 12 Drawing Sheets

PHOTOELECTRIC SENSOR

BACKGROUND OF THE INVENTION

1. Field of the Invention

This invention relates to a photoelectric sensor.

2. Description of the Related Art

Photoelectric sensors have been conventionally known. A conventional photoelectric sensor involves a mark affixed to a surface of an object. The mark typically has a different color than the surface of the object. The object is conveyed through a detection field and a visible light is emitted from light-emitting device so as to shine (i.e., irradiate, illuminate) onto the mark and the object's surface as they pass through the detection field. A light-receiving device ascertains the reflected light from the mark and the object. The photoelectric sensor is able to detect the mark on the object based upon a quantity of light received. The quantity of light reflected and received varies according to the differences in the color of the mark and the color of the surface of the object. Accordingly, the mark on the object is detected on the basis of a varying quantity of light received.

A quantity of light reflected from the object and then received by the light-receiving device changes according to the relationship between the color of emitted light illuminating the object and the color of the object's surface. More specifically, when one of a red light, green light, and blue light are emitted, the green light is reflected best in a situation where the surface of the object is green. The blue light, which is nearer in the color spectrum to the green light, is reflected better than the red light. The red light has the weakest reflection since the wavelength for red is the farthest away from the green light (of the three colors used). Accordingly, a large quantity of reflected light is desired when an emitted light shines upon a mark in order to accurately detect the mark on the surface of an object with consistency and stability. Conversely, a color of light is desired which exhibits the smallest quantity of reflection when the light is shining on a part of the surface of the object other than the mark. For example, a red light may be irradiated onto an object's surface when the mark is red and the object's surface is green.

In view of the foregoing, JP-A-11-14459 discloses a color discrimination sensor. Quantities of received light are sampled when light-emitting/receiving operations are carried out using red, blue, and green colors, with regard to the mark and the surface of the object other than the mark. For each of the three colors, a difference is obtained between the quantity of received light from the light irradiated onto the mark and the quantity of received light from the light irradiated onto the object's surface. The desired color of the light is the color that exhibits the largest difference between the received (reflected) light obtained by the light-receiving sensors when that color of light is shining on the mark and onto a part of the object's surface other than the mark.

However, the quantity of light reflected and received varies according to the fluttering, consistency, or trim of the objects during the object's movement across a detection area. For example, when an object or the surface of an object is flimsy, such as wrapping film, the quantity of light reflected and received varies according to the undulation of the surface of the object. The difference between the quantities of received light varies with the variations in the quantity of reflected light. Accordingly, the color of light that produces the largest difference between the reflected quantities of light from the mark and the surface of the object is not always the most suitable color for the detection of a mark.

SUMMARY OF THE INVENTION

Therefore, an object of the present invention is to provide a photoelectric sensor which can accurately and stably detect a mark on a surface of an object.

The present invention provides a photoelectric sensor that includes light-emitting device for emitting (i.e., shining) a plurality of different colors of light onto a detection field. The photoelectric sensor also includes a light-receiving device for receiving the light reflected from or passed through a mark affixed to the surface of an object, and the light reflected from or passed through a part of the surface of the object other than the mark. The detected object exists at least temporarily in the detection field. The light-receiving device detects the quantity of light reflected and subsequently received resulting from the color of light emitted from the light-emitting device. The mark is detected on the basis of the changes in the level of the quantity of light received by the light-receiving device. The photoelectric sensor comprises a reference received light quantity sampling device for sampling the reference received light quantity level. The reference received light quantity level is the received light quantity level in a situation where a part of the object other than the mark is present in the detection field. The part of the surface of the object other than the mark is subjected to every color of light emitted from the light-emitting device. The reference received light quantity level is typically determined prior to the mark detecting operation during initiation and set up of the photoelectric sensor. The photoelectric sensor also comprises a mark received light quantity sampling device for sampling the mark received light quantity level. The mark received light quantity level is the received light quantity level in a situation where the mark on the surface of the object is present in the detection field and subjected to every color of light emitted from the light-emitting device. The photoelectric sensor includes a first calculation device for obtaining a ratio of, the difference between the reference received light quantity level and the mark received light quantity level, to the reference received light quantity level or the mark received light quantity level. The ratio is determined for every color of light emitted. The photoelectric sensor also comprises a selecting device for selecting the color of light that has said largest ratio from among all of the colors of light. The selecting device chooses from the ratios obtained by the first calculation device. The color of light selected by the selecting device is emitted from the light-emitting device in order to detect the mark.

Prior to the detection of a mark, a reference received light quantity level is determined by the reference received light quantity sampling device. As stated previously, reference received light quantity levels are determined for every color of light emitted from the light-emitting device. The reference received light quantity level is ascertained when a part of the surface of the object, other than the mark, is present in the detection field and individually subjected to every color of emitted light. Furthermore, a mark received light quantity level is determined by the mark received light quantity sampling device for each color of light emitted by the light-emitting device. The mark received light quantity levels are determined for the mark of the object when the mark is present in the detection field and individually subjected to every color of emitted light. Subsequently, the first calculation device calculates a ratio of, the difference between the reference received light quantity level and the mark received light quantity level, to the reference received light quantity level or the mark received light quantity level. These ratios are also calculated for every color of light. Furthermore, the selecting device selects the color of light that has the largest ratio from among all of the colors of light for which the ratios have been obtained by the first calculation device. The color of light selected by the selecting device is emitted from the light-emitting device in order to detect the mark. Consequently, the detecting operation is less susceptible to adverse effects such as the undulation of the surface of the objects and accordingly, achieves a highly accurate level of mark detection.

The first calculation device obtains the difference between the reference received light quantity level and the mark received light quantity level. When the difference between the reference received light quantity level and the mark received light quantity level is at or above a predetermined level, the colors of light associated with those differences are subject to further selection. The selecting device selects the color of light that has the largest ratio out of the colors of light having a difference obtained by the first calculation device at or above a predetermined level.

Electromagnetic noise sometimes reduces the detection accuracy when the difference between the reference received light quantity level and the mark received light quantity level is below a predetermined level. In the above-described arrangement, however, when the difference between the reference received light quantity level and the mark received light quantity level is at or above a predetermined level, the color of light for that difference is identified. Then the color of light having the largest ratio is selected from among the color(s) of light identified as having a difference at or above a predetermined level. Consequently, the current system prevents excessive reduction in the detection accuracy due to electromagnetic noise.

The first calculation device obtains the difference between the reference received light quantity level and the mark received light quantity level. The selecting device discriminates between the colors of light (if any) in which the received light level difference obtained by the first calculation device is at or above a predetermined level. The selecting device then selects the color of light that has the largest ratio from among the discriminated colors of light.

When the difference between the reference received light quantity level and the mark received light quantity levels for a particular color of light is below the predetermined level, electromagnetic noise may sometimes reduce the detection accuracy for that color. The detection accuracy may be reduced since the color of light associated with the difference has a low tolerance for electromagnetic noise. However, in the above-described arrangement a difference is obtained between the reference received light quantity level and the mark received light quantity level by the first calculation device. The color(s) of light having a difference that is at or above a predetermined level is determined. Of the determined colors of light, the color of light having the largest ratio is selected. Consequently, the photoelectric sensor is protected from a reduction in detection accuracy due to interference by electromagnetic noise.

The invention also provides a photoelectric sensor which includes light-emitting device for emitting a plurality of different colors of light onto a detection field. The photoelectric sensor also includes light-receiving device for receiving light reflected from or passed through a mark affixed to an object and light reflected from or passed through a part of the object other than the mark. The object is at least momentarily in the detection field. The light-receiving device receives a portion of the reflected light resulting from the light emitted by the light-emitting device. The mark is detected on the basis of changes in the level of the quantity of light received by the light-receiving device. The photoelectric sensor further comprises a reference received light quantity sampling device for sampling reference received light quantity levels. The reference received light quantity level is the received light quantity level in a case where a part of the object other than the mark is present in the detection field and subjected to every color of light emitted from the light-emitting device. The reference received light quality levels are determined prior to a mark detecting operation during a photoelectric sensor initiation or setting operation. The photoelectric sensor additionally includes a mark received light quantity sampling device for sampling mark received light quantity levels. The mark received light quantity levels are the received light quantity levels for the situation where the mark of the object is present in the detection field and subjected to every color of light emitted from the light-emitting device. The photoelectric sensor still further includes a first calculation device for obtaining a ratio of the reference received light quantity level to the mark received light quantity level, for every color of light. In addition, the photoelectric sensor comprises a selecting device for selecting the color of light which has said largest ratio from among the colors of light for which the ratios have been obtained by the first calculation device. The color of light selected by the selecting device is emitted from the light-emitting device in order to detect the mark during the mark detecting operation.

Prior to detection of a mark, a reference received light quantity level is sampled by the reference received light quantity sampling device for the situation in which a part of the object other than the mark is present in the detection field and subjected to every color of light emitted from the light-emitting device. Furthermore, a mark received light quantity level is sampled by the mark received light quantity sampling device for the situation in which the mark of the object is present in the detection field and subjected to every color of light emitted from the light-emitting device. Subsequently, the first calculation device obtains a ratio of the mark received light quantity level to the reference received light quantity level. The ratio is obtained for each color of light. Furthermore, the selecting device selects the color of light that has said largest ratio of all the colors of light for which the ratios have been obtained by the first calculation device. The color of light selected by the selecting device is emitted from the light-emitting device in order to detect the mark during the mark detecting operation. Consequently, the detecting operation is less susceptible to the adverse effects of undulations or variations of the surface of the object. Accordingly, highly accurate mark detection is achieved.

The object may be conveyed across the detection field. The mark affixed to the object is detected as the object passes through the field. The light-emitting device includes a single light-emitting element incorporating a plurality of LED chips. Each LED chip emits a different color of light. The LED chips are disposed along a row. When a light is emitted from the plurality of LED chips, the emitted light from the particular LED chip is eventually irradiated onto the detection field in a direction perpendicular to the conveyed direction of the object.

In the above-described arrangement, a single light-emitting element incorporates a plurality of LED chips. The LED chips are oriented in a row. Consequently, the space between the various positions of the rays of light is shortened.

Furthermore, the mistiming of mark detection can be inhibited or prevented since the originating positions of the rays of light emitted from the respective LED chips are ultimately perpendicular to the conveyed direction of the object.

The invention further provides a photoelectric sensor including light-emitting device for emitting a plurality of colors of light individually and a light-receiving device for receiving light reflected from or passed through an object located in a detection field. The photoelectric sensor also includes a sampling device for sampling a received light quantity level of the light received by the light-receiving device for each color of light. A detecting operation is carried out on the basis of the received light quantity level obtained by the sampling device. The photoelectric sensor also comprises a mode switching device capable of switching the operation mode between a mark detecting mode, for detecting the mark on the object, and a color detecting mode, for detecting a predetermined color regarding the object present in the detection field. The sampling device includes reference received light quantity sampling device for sampling the reference received light quantity levels. The sampling reference received light quantity levels are the received light quantity levels in a situation where a part of the object other than the mark is present in the detection field and subjected to each color of light emitted from the light-emitting device. When the operation mode has been switched to the mark detecting mode, the sampling device further includes a mark received light quantity sampling device for sampling the mark received light quantity levels. The mark received light quantity levels are the received light quantity levels in a situation where the mark attached to the object is present in the detection field and subjected to every color of light emitted from the light-emitting device. The photoelectric sensor includes a first calculation device for obtaining a ratio of the difference between the reference received light quantity level and the mark received light quantity level, to the reference received light quantity level or the mark received light quantity level. The ratio is obtained for each color of light emitted from the light-emitting device. The photoelectric sensor further includes a selecting device for selecting the color of light that has the largest ratio from among all of the colors of light for which the ratios have been obtained by the first calculation device. The color of light selected by the selecting device is emitted from the light-emitting device during the mark detecting operation. Also included is a second calculation device for adding together all of the received light quantity levels of the respective colors of light sampled by the sampling device. The second calculation device then obtains a ratio of an added received light quantity level to the received light quantity level. The ratio is determined for each color of light when the operation mode has been switched to the color detecting mode. The ratio obtained by the second calculation device is compared with a ratio of the added received light quantity level obtained on the basis of the received light quantity level of light received during the detecting operation, for each color of light, to a received light quantity level of each color of light. Consequently, the photoelectric sensor detects when the color of the object in the detection field is the same as a sampled predetermined color.

In the above-described photoelectric sensor, the detection of a mark affixed to the object and the detection of the color of the object can be carried out using a common light-emitting device and a common light-receiving device. The detections are preformed by switching between the mark detecting mode and the color detecting mode. Consequently, the number of components can be reduced as compared with the case in which two separate configurations are respectively required for mark detection and for color detection.

BRIEF DESCRIPTION OF THE DRAWINGS

Other objects, features and advantages of the present invention will become clear upon reviewing the following detailed descriptions of the embodiments with reference to the accompanying drawings, in which.

DETAILED DESCRIPTION OF THE INVENTION

Figure 1:
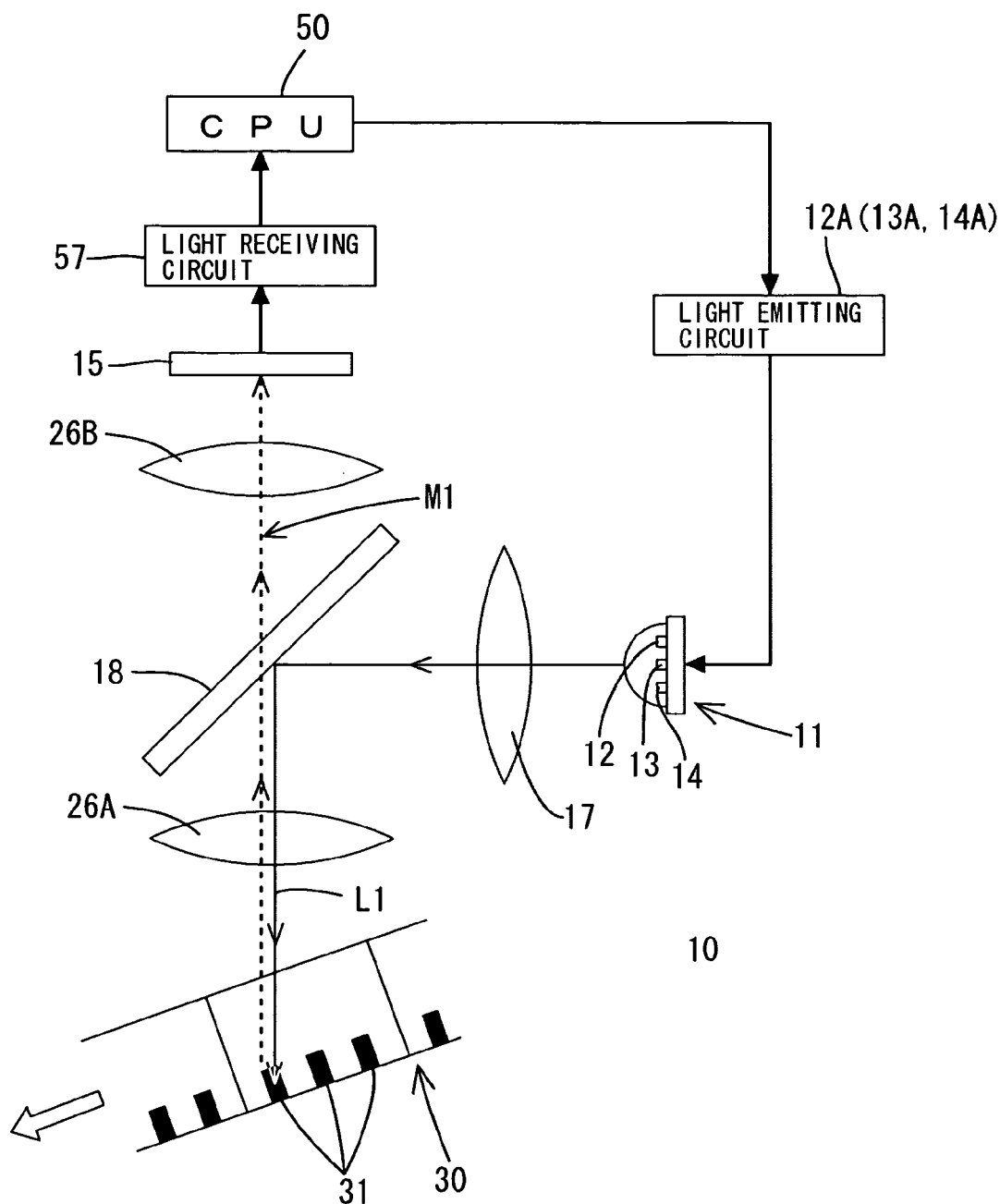
FIG. 1 is a schematic view of the overall construction of the photoelectric sensor in accordance with one embodiment of the present invention.

One embodiment of the present invention will be described with reference to the accompanying drawings. Referring to FIG. 1, the photoelectric sensor 10 is shown as an embodiment of the invention. For example, the photoelectric sensor 10 may be used to detect a mark 31 on a sheet 30 (an object) conveyed by rollers (not shown). The photoelectric sensor 10 comprises a light-emitting element 11 (light-emitting device) emitting a light that shines (i.e., is irradiated or illuminated) onto the sheet 30 (the surface) and a light-receiving element 15 (light-receiving device) receiving light reflected from the sheet 30. The light-receiving element 15 generates a signal according to the quantity level of received light. The mark 31 is detected on the basis of the received light quantity level. In detection of the mark 31, an operating mode is adapted to be switched by an operator between a mark detecting mode and a color detecting mode. Consequently, two different types of detecting operations can be selected for detection of the mark 31.

Figure 2:
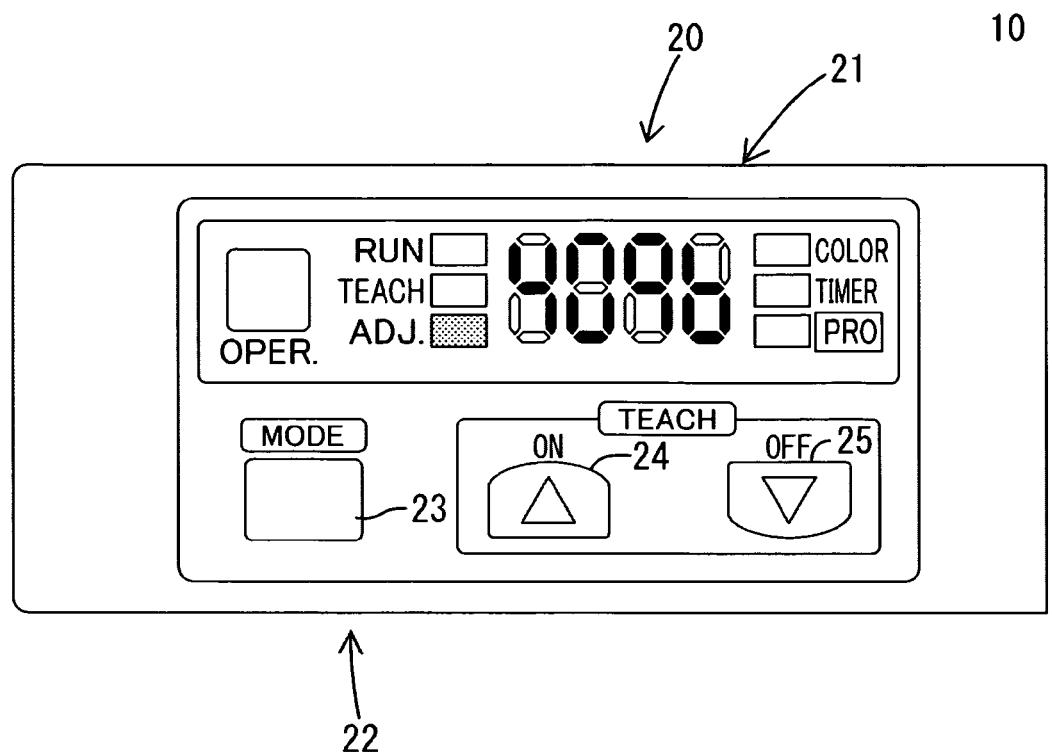
FIG. 2 is a top view of the body casing of the photoelectric sensor.

1. Arrangement of the Photoelectric Sensor:

The photoelectric sensor 10 includes a sensor body 20 (see FIGS. 2 and 3) formed into the general shape of a flat box. A digital display 21 and an operation section 22 may be provided on the top of the sensor body 20 as shown in FIG. 2. The digital display 21 displays the current setting and the like. The operation section 22 is operated (actuated) to carry out a predetermined setting. The operation section 22 is provided with a mode key 23 (mode switching device, for example, virtual, electronic or mechanical switch) for switching the operating mode, a teaching-on switch 24 operated for sampling a received light quantity level, a teaching-off switch 25, and the like. The mode key 23 is used to switch the operating mode between the mark detecting mode and the color mode (color detecting mode), as will be described in detail later. Furthermore, when the mode key 23 is depressed during the mark detecting mode or the color mode, the operating mode is switched to a teaching mode for sampling the received light quantity level. The teaching-on switch 24 is adapted to detect the received light quantity level of the light reflected from the mark 31 when the switch is depressed while the operating mode is the teaching mode and while a mark 31 is located in the detection field. However, the teaching-off switch 25 is adapted to detect the received light quantity level of the light reflected from the surface of the object other than the mark 31 when the switch is depressed while the operating mode is the teaching mode and while the surface of the object other than the mark 31 is located in the detection field.

Figure 3:
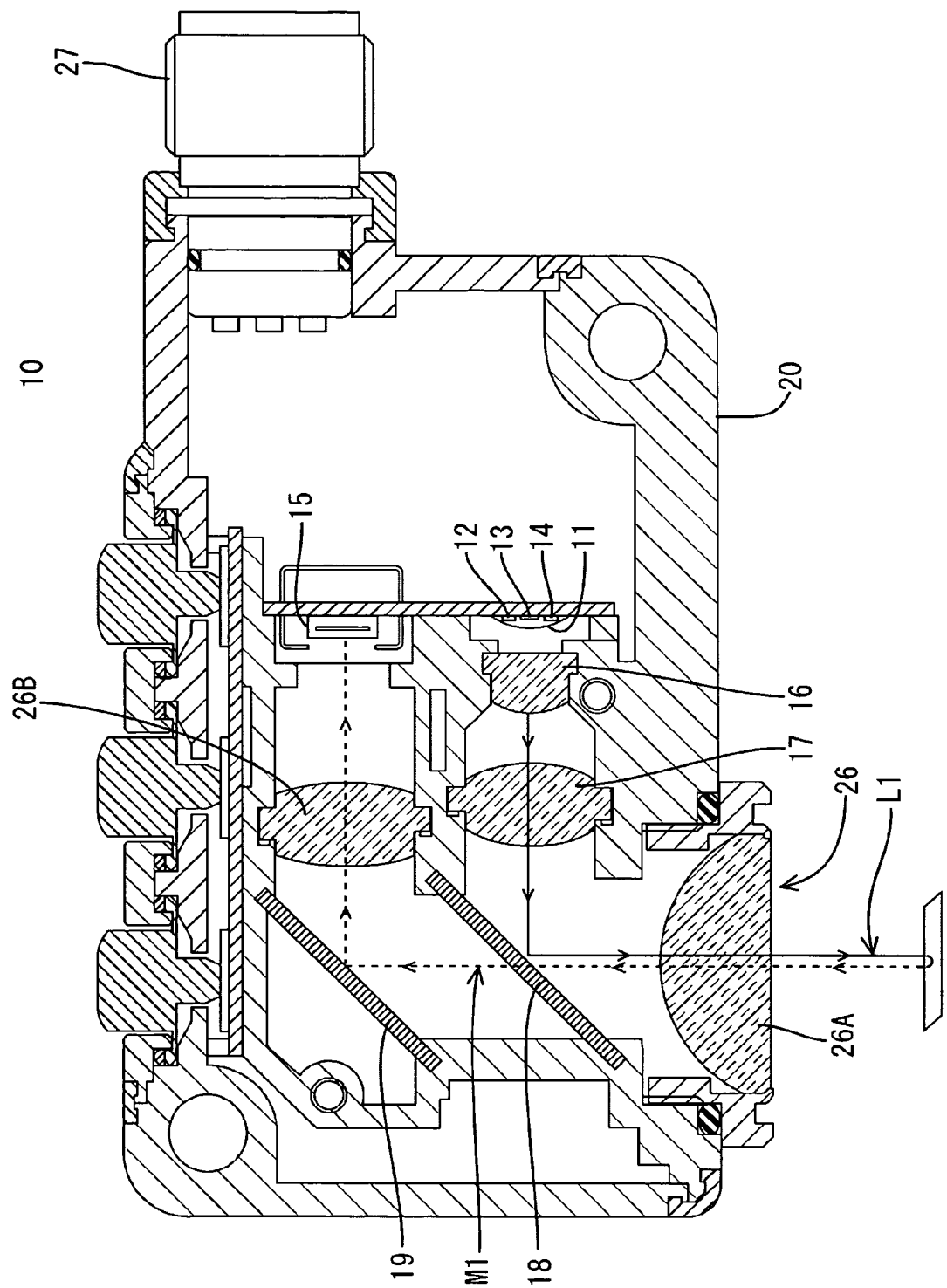
FIG. 3 is a sectional view of the interior construction of the photoelectric sensor.

Conversely, the underside of the sensor body 20 is directed towards the side of the sheet 30 and is formed with a light-emitting/receiving window 26 (as seen in FIG. 3). The sensor body 20 includes an opening in which a condenser lens 26A is fitted as a part of the light-emitting/receiving window 26. The rear of the sensor body 20 is formed with a cable-connecting portion 27 protruding therefrom. External equipment (not shown) is adapted to be connected to the cable-connecting portion 27 so that a signal, such as a detection signal, is supplied to the external equipment.

A light-emitting element 11 (for example, LED, LASER, incandescent, or other light sources) and a light-receiving element 15 (for example, a photodiode or other light sensitive elements) are preferably disposed within the sensor body 20 so that optical axes of the respective elements are directed in the same directions. The light-emitting element 11 may be located nearer to the underside of the sensor body 20 (formed with the light-emitting/receiving window 26) than the light-receiving element 15, as shown in FIG. 3. The light-emitting element 11, for example, comprises three LED chips 12, 13, and 14, aligned into a row in a single package. The three LED chips emit red light (chip 12), green light (chip 13), and blue light (chip 14), all differing from one another in wavelength and consequently, color.

A half mirror 18 is provided in front (to the left in FIG. 3) of the light-emitting element 11. A total reflection mirror 19 is provided in front of the light-receiving element 15. The condenser lens 26A, the half mirror 18, and the total reflection mirror 19 are vertically aligned in a row. Furthermore, a semi-cylindrical lens 16 is provided just in front of the light-emitting element 11. The semi-cylindrical lens 16 has a generally semi-cylindrical section and includes a convexly curved surface that is directed to the side facing the half mirror 18. A collimating lens 17 is provided in front of the semi-cylindrical lens 16 so as to be located substantially in the middle, between the half mirror 18 and the light-emitting element 11. Light becomes parallel rays with linear irradiation after having passed through the collimating lens 17. The parallel rays are irradiated onto the half mirror 18 disposed in front of the collimating lens 17. The half mirror 18 is angled and positioned so as to reflect light that has passed through the collimating lens 17, so that the reflected light L1 (FIG. 1) is directed to the light-emitting/receiving window 26.

Consequently, the light L1 emitted from the light-emitting element 11 is separated by the half mirror 18 into the reflected light L1 and light transmitted through the half mirror 18. The reflected light L1 is condensed by the condenser lens 26A so that linear parallel rays are irradiated onto the sheet 30 in a direction perpendicular to the conveying direction of the sheet 30. The light reflected from the sheet 30 is returned through the condenser lens 26A onto the half mirror 18. The half mirror 18 again separates the light into light M1 transmitted through the half mirror 18 and reflected light. The direction of the transmitted light M1 is preferably reflected perpendicularly to the side of the light-receiving element 15 by the total reflection mirror 19. The light is then condensed by the condenser lens 26B and received by the light-receiving element 15. A received light signal corresponding to the level of received light quantity is supplied to CPU 50 via a light-receiving circuit 57.

2. Electrical Arrangement of Photoelectric Sensor:

The three LED chips 12, 13, and 14, of the light-emitting element 11 are respectively connected to a central processing unit (CPU) 50 via light-emitting circuits 12A, 13A, and 14A. CPU 50 supplies light emission signals to the respective light-emitting circuits 12A to 14A so that the light-emitting circuits are individually driven or energized. The light may then be sequentially emitted from the LED chips 12 to 14.

Figure 4:
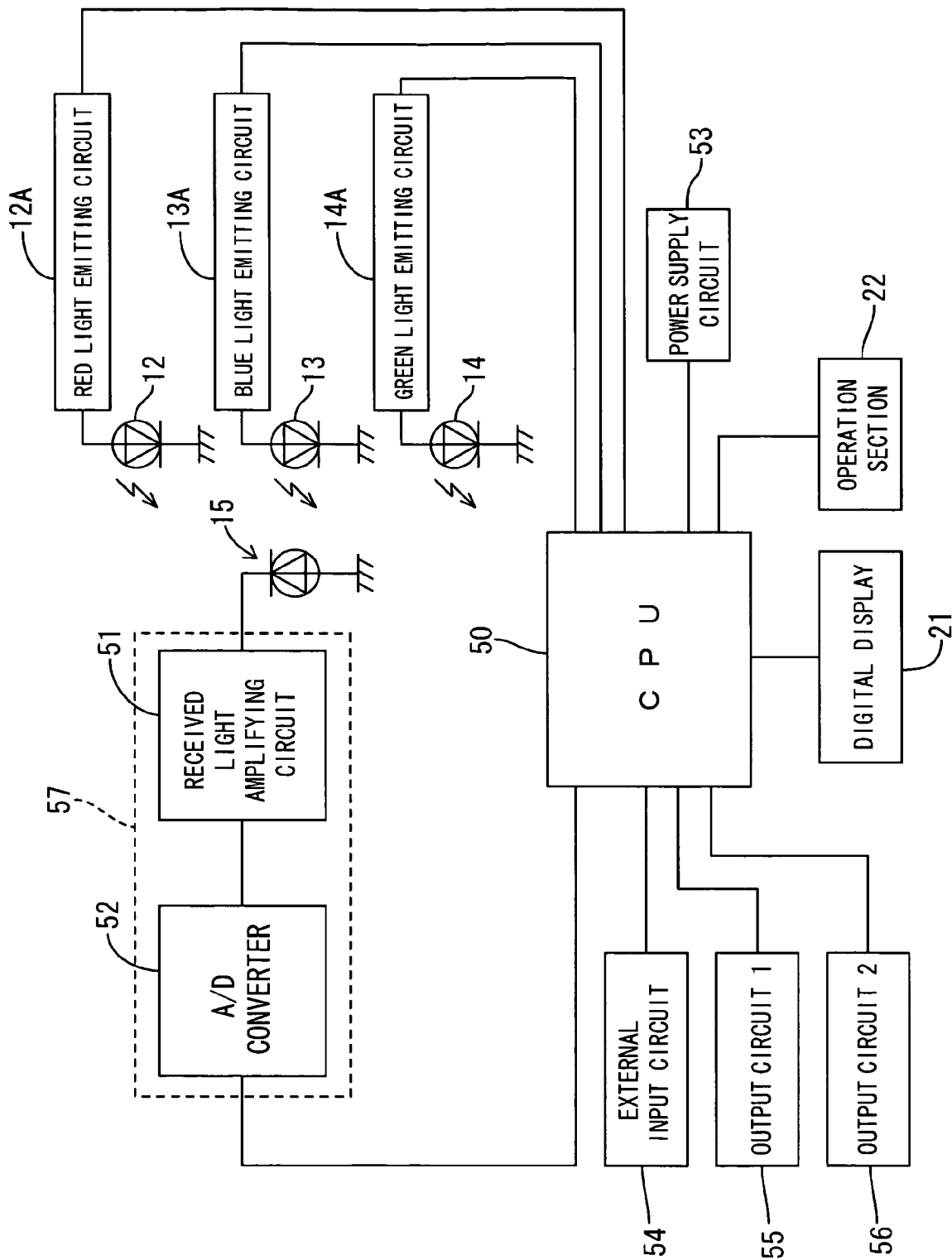
FIG. 4 is a block diagram showing an electrical arrangement of the photoelectric sensor.
Figure 5:
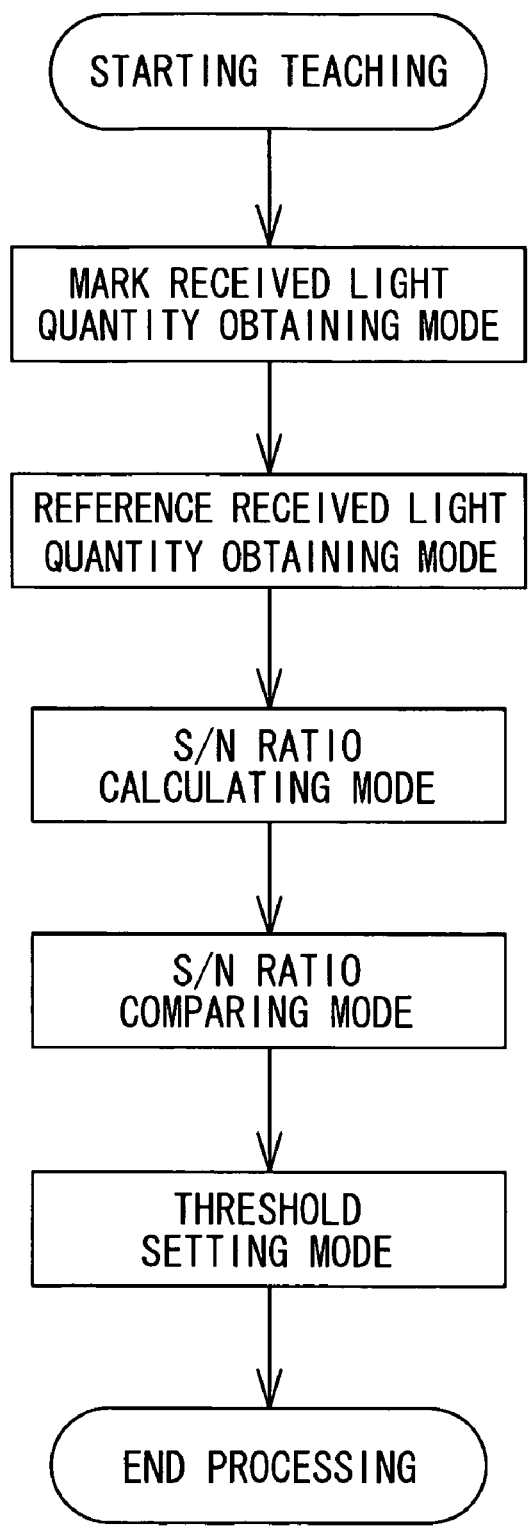
FIG. 5 is a flowchart showing the mark detecting mode.

The light-receiving element 15 is connected to a received light amplifying circuit 51 (FIG.4) in order to amplify the light reception signal generated by the light-receiving element 15. The light reception signal amplified by the received light amplifying circuit 51 is divided by an A/D converter 52 into signals based on the red, green, and blue lights, so as to be respectively converted into digital quantities. The digitized light reception signals (received light values) are supplied to CPU 50. Furthermore, the operation section 22 and the digital display 21 are also connected to CPU 50. When the operation section 22 is actuated, a signal is supplied to CPU 50 and a predetermined piece of information is displayed on the digital display 21 in regards to the detection of the mark 31. A power supply circuit 53 supplying electric power to CPU 50, an external input circuit 54, and output circuits 55 and 56, are further connected to CPU 50.

3. Processing by CPU:

Processing by CPU 50 will now be described with reference to FIGS. 5 to 11. CPU 50 detects signals transmitted by the operation of the mode key 23. The CPU 50 may switch a current mode into a mark detecting mode or a color mode depending upon the detected signal.

A. Mark Detecting Mode:

When the mark detecting mode is set, CPU 50 determines whether the mode key 23 has been depressed. The current mode is switched to a teaching mode when mode key 23 is detected as being depressed or operated.

Teaching Mode:

<Mark Received Light Quantity Obtaining Mode>

Figure 6:
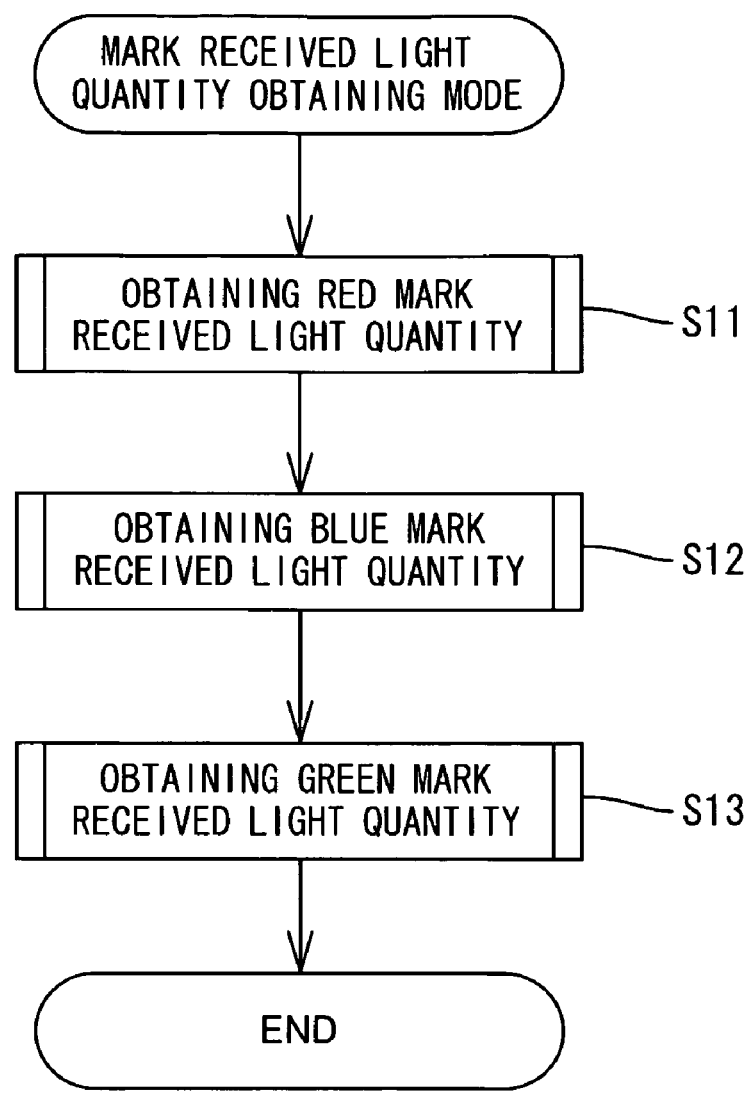
FIG. 6 is a flowchart showing the mark received light quantity obtaining mode.

In the teaching mode (i.e., for initiation or set-up of the photoelectric sensor), detection of a depressed teaching-on switch 24 causes the CPU 50 to switch the current mode to the mark received light quantity obtaining mode (FIG. 6), as shown in FIGS. 5 to 9. The CPU 50 then sequentially supplies light emission signals in the order of red, blue, and green, respectively, to the light-emitting circuits 12A, 13A, and 14A. The light-emitting circuits 12A, 13A, and 14A, are energized so that the LED chips 12–14 emit light. Furthermore, the operator positions the mark 31, located on the sheet 30, within the lighted spot position, resulting in the emitted light being reflected from the mark 31. The reflected light is sequentially received by the light-receiving element 15. The CPU 50 samples the signals according to the received light quantity level (corresponding to the mark received light quantity sampling device). The CPU 50 stores the received light quantity level in a memory device (not shown, such as ROM, RAM, magnetic media, optical media, flash memory, and the like) at steps S11 to S13 (FIG. 6).

<Reference Received Light Quantity Obtaining Mode>

Figure 7:
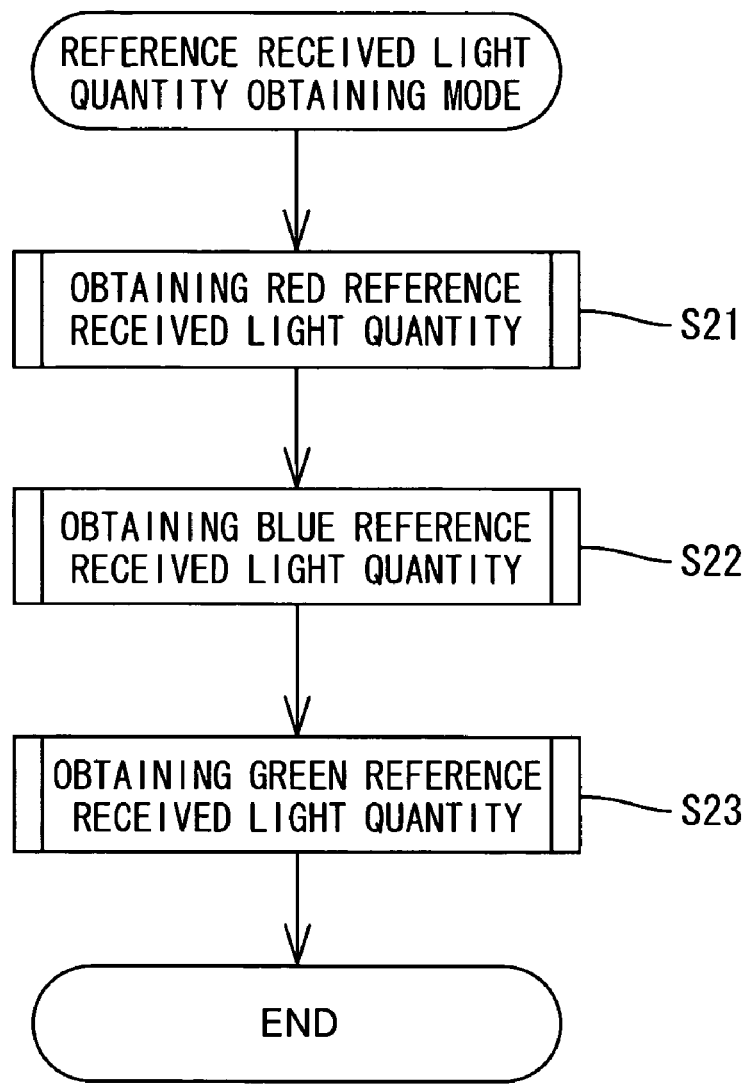
FIG. 7 is a flowchart showing the reference received light quantity obtaining mode.

Subsequently, detection of the depression of the teaching-off switch 25 causes the CPU 50 to select a reference received light quantity obtaining mode (see FIG. 7). The CPU 50 supplies light emission signals sequentially to the light-emitting circuits 12A, 13A, and 14A. The light-emitting circuits 12A, 13A, and 14A, are then sequentially driven so that the LED chips 12, 13, and 14, emit light. Since the operator sets the surface of the sheet 30 (other than the mark 31) in the lighted spot, the emitted light is reflected from the surface of the sheet 30 and is received by the light-receiving element 15. A signal is generated according to the level of received light quantity sampled by the CPU 50 (corresponding to reference received light quantity sampling device). The CPU 50 stores the received light quantity level in a memory device as a reference received light quantity level in steps S21 to S23 (FIG. 7). CPU 50 then advances to the signal to noise (S/N) ratio calculating mode.

<S/N Ratio Calculating Mode>

Figure 8:
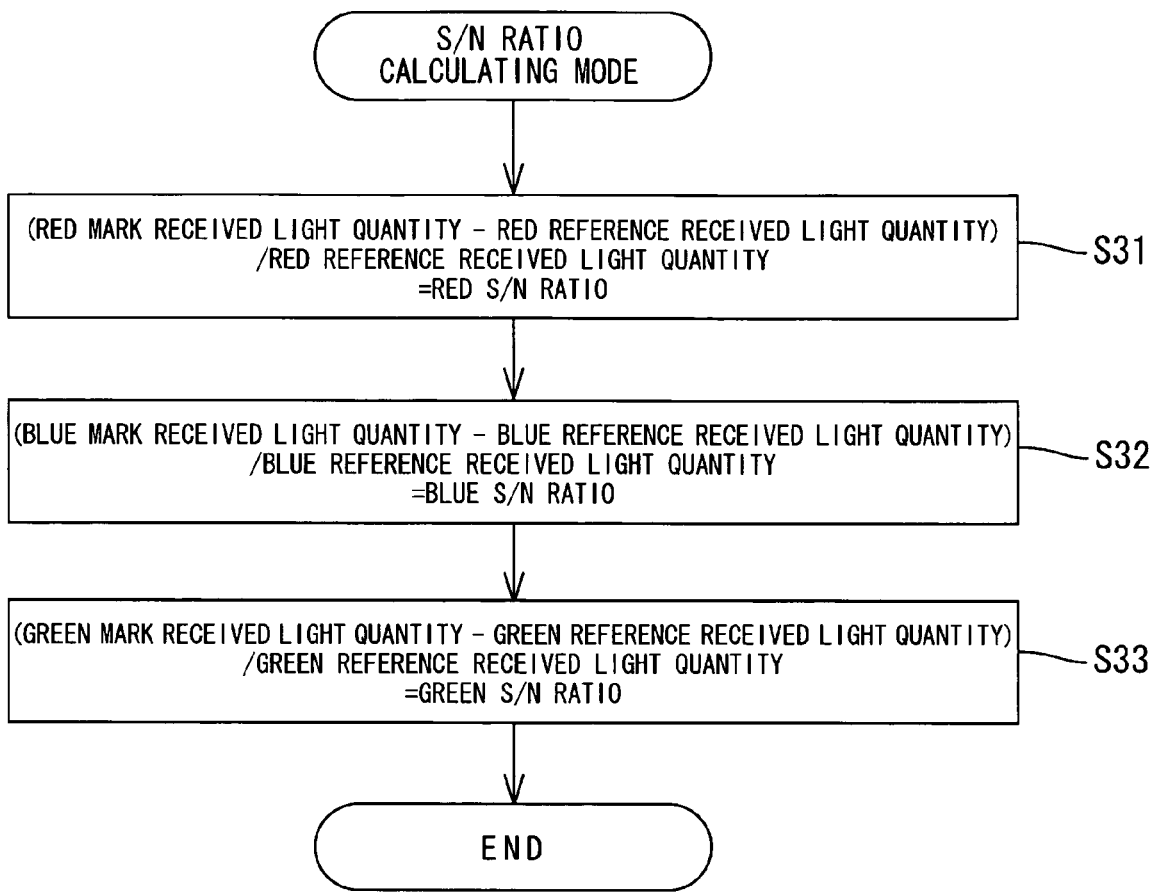
FIG. 8 is a flowchart showing a signal to noise (S/N) ratio calculating mode.

In the S/N ratio calculating mode, the CPU 50 reads the stored mark received light quantity levels and the reference received light quantity levels from the memory for each color of light of emitted light, as shown in FIG. 8. The CPU 50 calculates the difference between the mark received light quantity level and the reference received light quantity level for each color. The CPU 50 further calculates an S/N ratio of the obtained difference to the reference received light quantity level (corresponding to a first calculation device) at steps S31 to S33. The CPU 50 stores the data of the obtained differences and the S/N ratios in the memory, prior to advancing to the S/N ratio comparing mode. In the situation in which the object is the sheet 30, the mark received light quantity level may be higher than the reference received light quantity level.

<S/N Ratio Comparing Mode>

Figure 9:
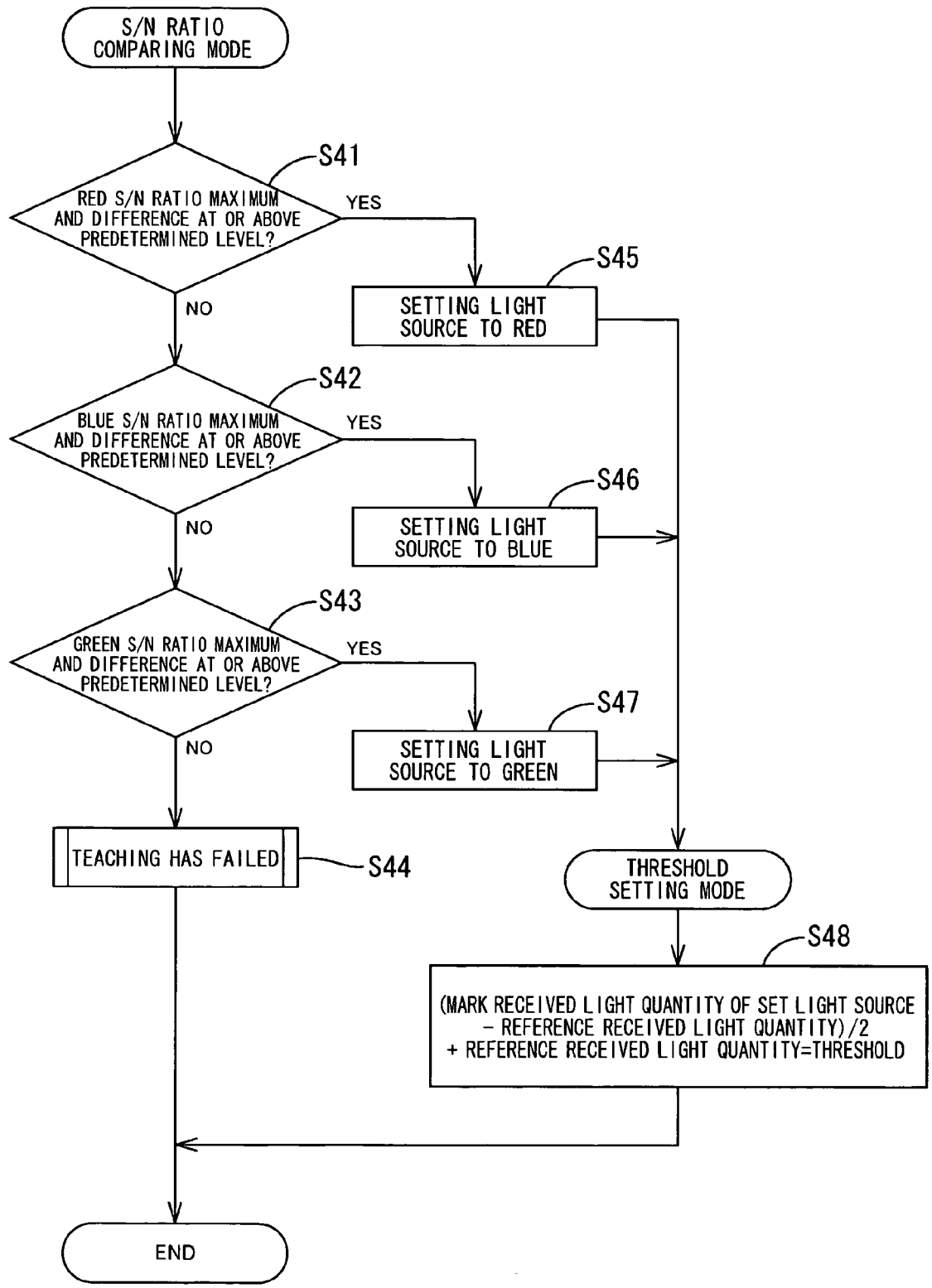
FIG. 9 is a flowchart showing a S/N ratio comparing mode.

In the S/N ratio comparing mode, the CPU 50 reads the stored differences to determine if the difference for a particular color is at or above a predetermined value. For all of the colors having a difference at or above a predetermined value, the CPU 50 reads the stored S/N ratios previously determined in order to find the maximum S/N ratio among the colors of emitted light equaling or exceeding the predetermined difference value. As shown in FIG. 9, the CPU 50 further sets the color of light to be emitted in the detecting operation as the color of light in which the foregoing level difference is at or above a predetermined value and the S/N ratio is at a maximum (YES at any one of steps S41 to S43; steps S45 to S47; and corresponding to a selecting device). Data indicating the set color of light is stored in the memory. When a plurality of S/N ratios is present (i.e., two or more equal and maximum S/N ratios), priority is given to the color of light in the order of emission (i.e., the following descending order, red, blue, and then green).

Conversely, when the difference between the mark and the reference received light quantity levels is below a predetermined level (NO at all of steps S41 to S43), the CPU 50 indicates a failure in teaching. The failure in teaching determination causes the digital display 21 to display an indication of the failure (step S44). The reason for the determination of a failure in teaching is that the colors of light in regards to the mark 31 and the sheet 30 have a low degree of tolerance to electromagnetic noise. Consequently, the determination of failure in teaching is made in order to prevent a reduction in the detection accuracy of the photoelectric sensor 10 due to noise.

<Threshold Setting Mode>

The CPU 50 advances to a threshold setting mode after setting the color of light to be emitted. As a threshold, the CPU 50 sets a received light quantity level obtained by adding the reference received light quantity level to half of the difference between the mark received light quantity level and the reference light quantity level (step S48). The CPU 50 stores the set threshold in the memory. The teaching mode is completed at this point.

C. Mark Detection Operation:

In the detection of mark 31, CPU 50 supplies a light emission signal to the light-emitting circuit 12A, 13A, or 14A, to indicate the set color of light to be emitted. The light-emitting circuit 12A, 13A, or 14A, operates the respective LED chip 12, 13, or 14, set so as to emit the set color of light having the largest S/N ratio out of the colors of light where the difference equals or exceeds a predetermined value. A spot or area of light is irradiated on the sheet 30, supplied via conveyance in this embodiment, and a signal according to a received light quantity level of the reflected light is supplied to CPU 50. When the received light quantity level is at or above the set threshold, the CPU 50 indicates detection of the mark 31. The CPU 50 then supplies a detection signal to the output circuit 55 and illuminates an operation indication lamp of the digital display 21.

Color Mode:

When the operation mode is the color mode, CPU 50 ascertains whether the mode key 23 has been depressed. The CPU 50 switches the operation mode to the teaching mode, so that the received light quantity level is settable, when the CPU 50 detects the depression of the mode key 23.

Teaching Mode:

In the teaching mode (i.e., for initiation or set-up of the photoelectric sensor), depressing the teaching-on switch 24 will cause the CPU 50 to sequentially supply the light emission signals to the light-emitting circuits 12A, 13A, and 14A. The light-emitting circuits 12A, 13A, and 14A, energize the respective LED chips 12, 13, and 14, resulting in the emission of light from the individual LED chips. The spot of light is a reference color and is positioned on the mark 31 of the sheet 30. The emitted light is reflected from the mark 31 to be sequentially received by the light-receiving element 15.

Figure 10:
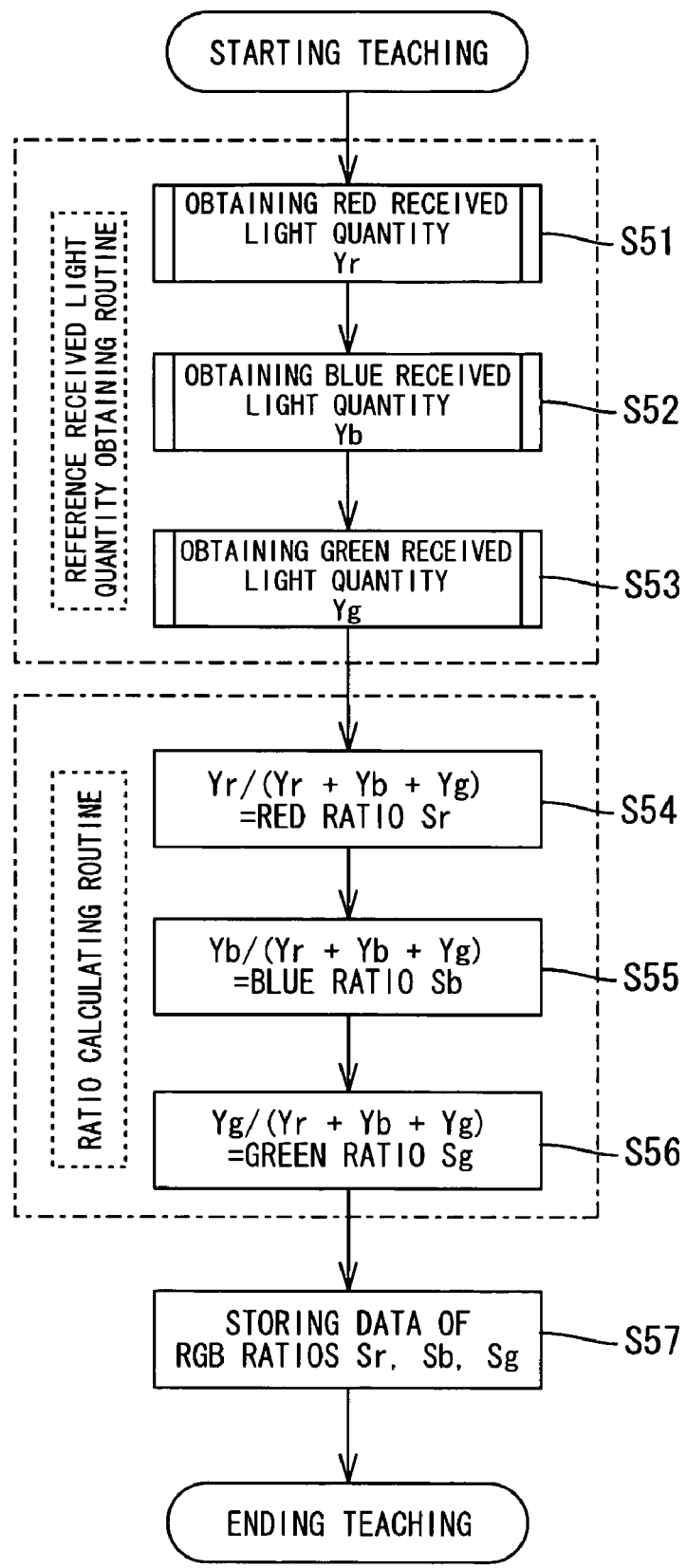
FIG. 10 is a flowchart showing teaching steps in the color mode.
Figure 11:
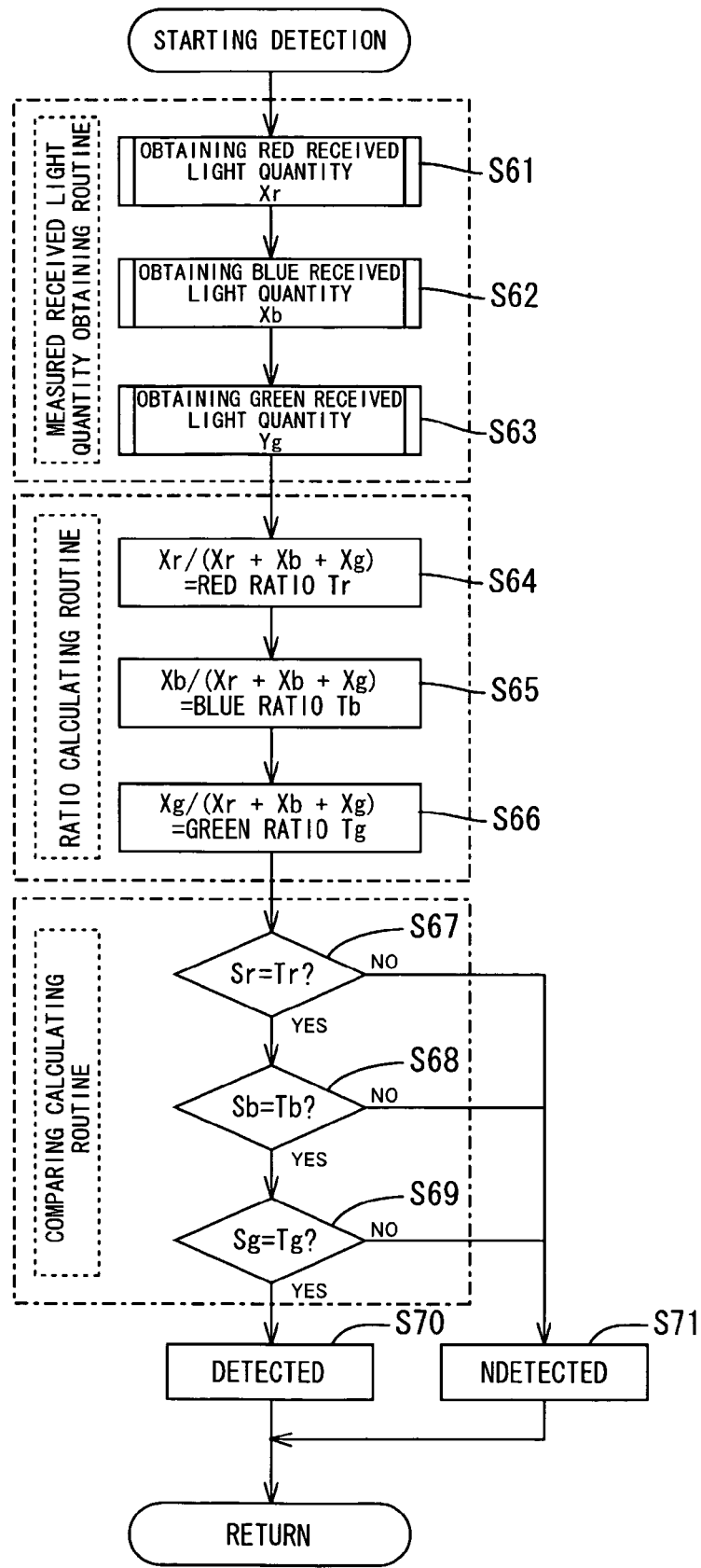
FIG. 11 is a flowchart showing the detecting operation steps in the color mode.

The received light is sampled by CPU 50 (corresponding to a sampling device) as the respective mark received reference light quantity levels Yr, Yb, and Yg (see FIG. 10). Data of the mark received reference light quantity levels Yr, Yb, and Yg, is stored in the memory as mark received reference light quantity levels (steps S51 to S53). Subsequently, CPU 50 reads the data of the mark received reference light quantity levels Yr, Yb, and Yg, with respect to each color of light, and adds together all of the mark received reference light quantity levels Yr, Yb, and Yg. Ratios Sr, Sb, and Sg, are then obtained by dividing the mark received reference light quantity levels Yr, Yb, and Yg, of each color of light by the total of the addition of all of the mark received reference light quantity levels Yr+Yb+Yg (steps S54 to S56; and corresponding to a second calculation device). The CPU 50 stores the aforesaid ratios Sr, Sb, and Sg, in the memory device (step S57) and finishes the teaching mode.

Mark Detection:

In order to detect the mark 31, after receiving a signal indicating the entry of the sheet 30 into the detection field, the CPU 50 respectively supplies sequential light emission signals to the light-emitting circuits 12A, 13A, and 14A. The light-emitting circuits 12A, 13A, and 14A, are driven so as to cause the LED chips 12, 13, and 14, to emit light. The emitted light may be reflected from the mark 31 located on the sheet 30. The reflected light is received by the light-receiving element 15. Signals according to the received light quantity levels Xr, Xb, and Xg (see FIG. 11), are supplied to CPU 50. The CPU 50 then stores data of the received light quantity levels Xr, Xb, and Xg, in the memory device (steps S61 to S63).

Subsequently, CPU 50 reads out data of the received light quantity levels Xr, Xb, and Xg, with respect to each color of light and adds together the received light quantity levels Xr, Xb, and Xg. Ratios Tr, Tb, and Tg, are obtained by respectively dividing the received light quantity levels Xr, Xb, and Xg, of each color of light by the total addition of received light quantity levels Xr+Xb+Xg. The CPU 50 then stores the aforesaid ratios Tr, Tb, and Tg, in the memory device (steps S64 to S66).

The CPU 50 then reads the data of the ratios Sr, Sb, and Sg, of the mark received reference light quantity levels Yr, Yb, and Yg, to the total addition of the mark received reference light quantity levels Yr+Yb+Yg, which had been previously stored in the memory device during the color mode teaching mode. The CPU 50 then determines whether the ratios Sr, Sb, and Sg, are respectively equal to the ratios Tr, Tb, and Tg, for each color of light (steps S67 to S69). In this situation, when the ratios Sr, Sb, and Sg, are respectively equal to the ratios Tr, Tb, and Tg, for each color of light, CPU 50 determines that the mark 31 has been detected (YES at steps S67–S69; and S70). When any one of the ratios Sr, Sb, and Sg, is not equal to a corresponding ratio Tr, Tb, and Tg, CPU 50 indicates that the mark 31 has not been detected (NO at any one of steps S67–S69; and S71). Preferably, each of the ratios Sr, Sb, and Sg, does not need to be exactly equal to a corresponding ratio Tr, Tb, and Tg. Instead, each of the ratios Sr, Sb, and Sg, may be considered to equal a corresponding ratio Tr, Tb, and Tg, when each of the ratios Sr, Sb, and Sg, is within a predetermined range surrounding a corresponding value of the ratios Tr, Tb, and Tg.

When determining that the mark 31 has been detected, CPU 50 supplies a detection signal to the output circuit 55 and illuminates the operation indication lamp of the digital display 21. Conversely, when the CPU 50 determines that the mark 31 has not been detected, there is no output of the detection signal and no illumination of the operation indication lamp. The foregoing operation is continued until the CPU 50 receives a signal indicative of the end of the detection.

Effect of the Embodiment:

In the mark detecting mode, a difference is calculated between the mark received reference light quantity level and the reference received light quantity level for every color of light. A ratio is obtained by dividing the above difference by the corresponding reference received light quantity level. The CPU 50 selects the color from which the largest ratio is obtained out of the ratios for the colors of light where the differences are equal or above a predetermined level. The selected color of light is used for the detection of the mark 31.

For example, consider the following conventional case. The difference is obtained between the mark received light quantity level and the reference received light quantity level as in the current invention. However, the color of light resulting in the largest difference is selected. In some cases, the quantity of light reflected from the sheet 30 and received by the light-receiving element 15 may vary according to the fluttering or trim of the sheet 30 when the detection of the mark 31 is carried out using the selected color of light. For example, when the sheet 30 is flimsy, such as wrapping film, the quantity of light reflected and received may vary according to the undulation of the sheet 30. With the variations in the quantity of light, the difference between quantities of received light also varies. Accordingly, the color of light for which the largest difference is obtained between the mark received light quantity level and the reference received light quantity level is not always the most suitable for mark detection. When the color of light is unsuitable for detection of mark 31, highly accurate detection of the mark 31 cannot be expected.

In the foregoing embodiment of the current invention, however, the difference between the mark received light quantity level and the reference received light quantity levels of the conventional example is further divided by the reference received light quantity level, thereby obtaining a ratio. The CPU 50 selects the color of light from which the largest ratio can be obtained from among colors of light where the difference equaled or exceeded a predetermined value. The selected color of light is used for detection of the mark 31. Consequently, even when the difference between the mark received light quantity level and the reference received light quantity levels varies according to the fluttering or trim of the sheet 30, the increases and decreases in the difference between the mark received light quantity level and the reference received light quantity levels corresponds to the increase and decrease in the reference received light quantity. Accordingly, the above ratio may not vary as much as the conventional example and a highly accurate detection of the mark 31 can be realized.

Furthermore, the detecting mode of the current invention may be switched between a mark detecting mode and a color detecting mode. Accordingly, by switching between the mark detecting mode and the color detecting mode, the detection of a mark 31 affixed to the sheet 30 and the detection of the color of a mark 31 affixed to the sheet 30 can be carried out using a common light-emitting element 11 and a common light-receiving element 15. Consequently, the number of components can be reduced as compared with the situation in which two separate configurations are respectively required for mark detection and for color detection.

Even further, a single light-emitting element 11 incorporates a plurality of LED chips 12, 13, and 14. The LED chips 12, 13, and 14, are oriented along a row. Consequently, the space can be reduced between the originating positions of the rays of light emitted from the LED chips 12, 13, and 14. Furthermore, mistiming of the detection of the mark 31 can be reduced since the originating positions of the light emitted from the respective LED chips 12, 13, and 14, are close enough together to result in light rays substantially perpendicular to the direction in which the sheet 30 is conveyed (after reflection from the half mirror 18).

Figure 12:
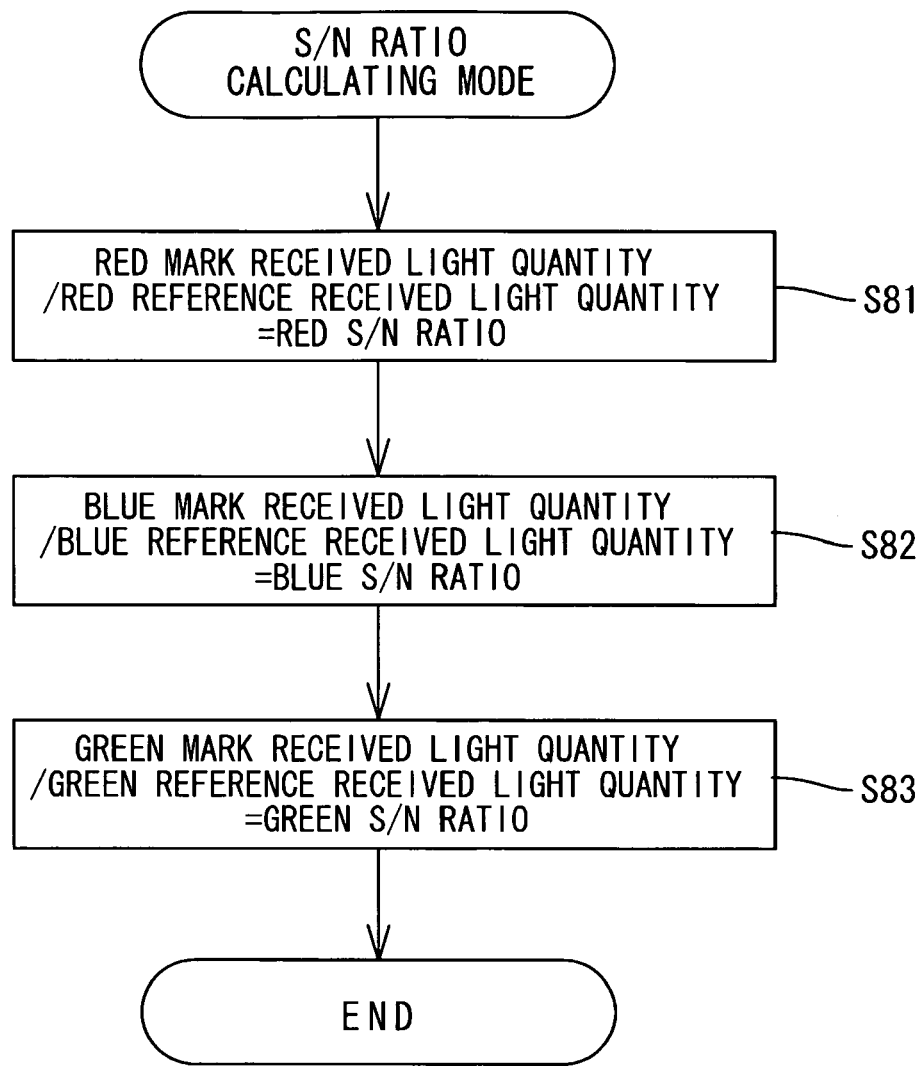
FIG. 12 is a flowchart showing a S/N ratio calculating mode in the photoelectric switch of a second embodiment of the invention.

FIG. 12 shows a second embodiment of the invention. In the previous embodiment, the S/N ratio is obtained by dividing the difference between the mark received light quantity level and the reference received light quantity level by the reference received light quantity level in the S/N ratio calculation mode. The color of light in which the S/N ratio is largest (from among the colors where the difference is equal to or exceeds a predetermined value) is emitted from the light-emitting element 11. In the second embodiment however, CPU 50 reads from the memory device, data of the mark received light quantity level and data of the reference received light quantity level for every color of light. The CPU 50 then ascertains the S/N ratios of the mark received light quantity level to the reference received light quantity level (steps S81 to S83; and corresponding to the ratio of the mark received light quantity level to the reference received light quantity level). Data of the obtained S/N ratios is stored in the memory device. The CPU 50 then advances to the S/N ratio comparing mode. The remaining configuration of the second embodiment is substantially the same as that in the first embodiment and the description of the remaining configuration will be eliminated.

In the above-described arrangement, even when the difference between the mark and reference received light quantity levels varies according to the fluttering or trim of the sheet 30, the increase and decrease in the difference between the mark received light quantity level and the reference received light quantity levels corresponds to the increase and decrease in the reference received light quantity. Accordingly, the above ratio does not vary much and allows the realization of highly accurate detections of the mark 31.

Several modified forms of the foregoing embodiments will now be described. The light-emitting element 11 emits a red light, green light, and blue light, in the foregoing embodiment. However, other colors may be employed instead of, or in addition to, one or more of these colors. Furthermore, the light-emitting element 11 may emit as few as two colors of light or four or more colors of light.

The mark received light quantity level is higher than the reference received light quantity level in the foregoing embodiments. However, the mark received light quantity level may be equal to or lower than the reference received light quantity level. For the current embodiment, the difference between the mark and reference received light quantity levels may be calculated in the form of an absolute value.

In the mark detecting mode, the CPU obtains the ratio of, the difference between the mark received light quantity level and the reference received light quantity level, to the reference received light quantity level. However, the CPU may instead obtain a ratio of, the difference between the mark received light quantity level and the reference received light quantity level, to the mark received light quantity level.

In the mark detecting mode, a plurality of larger ratios are involved, the light of the color with a priority in the order of light emission is emitted in the detecting operation. However, when a plurality of larger ratios is involved, light of the color with the largest difference between the mark received light quantity level and the reference received light quantity level may instead be selected for emission.

In the foregoing embodiments the object is the sheet 30. However, any other object having a mark of a different color from the surface may be used instead. Furthermore, in the mark detecting mode, the difference is obtained between the mark received light quantity level and the reference received light quantity level for each color of light. The obtained difference is divided by the reference received light quantity level so that a corresponding ratio is obtained. However, the reference received light quantity level may instead be divided by the difference between the mark and reference received light quantity levels. In this case, the color of light from which the smallest ratio is obtained, from among the corresponding colors of light in which the difference equals or exceeds a predetermined value, is emitted as the color of light suitable for detecting the mark in the mark detecting operation.

In the color mode, the mark received light quantity levels are added together for every color of light. The received light quantity level of each color of light is then divided by the total addition of the received light quantity level so as to obtain a ratio. However, the received light quantity level of each color of light may instead divide the total addition of the received light quantity levels so that a ratio is obtained.

The color of light with the largest S/N ratio (among the colors satisfying a difference requirement) is emitted in the mark detecting mode. However, a difference is obtained between the mark received light quantity level and the reference received light quantity level. When the obtained difference of the color of light with the largest S/N ratio is below the predetermined level, the light has a low degree of electromagnetic noise tolerance. Accordingly, the light to be emitted may have a color corresponding to the largest difference between the mark received light quantity level and the reference received light quantity level. This can prevent a reduction in the detection accuracy due to noise.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A photoelectric sensor which includes a light-emitting device for emitting a plurality of different colors of light onto a detection field, and a light-receiving device for receiving light reflected from an object in the detection field due to the emitted colors of light, wherein a mark is located on the object and is detected on the basis of changes in a level of a quantity of light received by the light-receiving device, the photoelectric sensor comprising:

a reference received light quantity sampling device for measuring a reference received light quantity level reflected from the object for each color of light emitted from the light-emitting device;

a mark received light quantity sampling device for measuring a mark received light quantity level reflected from the mark for each color of light emitted from the light-emitting device;

a first calculation device for obtaining a ratio of, a difference between the reference received light quantity level and the mark received light quantity level, to one of the reference received light quantity level or the mark received light quantity level, for each color of light emitted from the emitting device; and a selecting device for selecting the color of light which has a largest ratio from among all of the ratios obtained by the first calculation device;

wherein the color of light selected by the selecting device is emitted from the light-emitting device during a mark detection process.

2. The photoelectric sensor of claim 1, wherein the first calculation device further obtains a difference between the reference received light quantity level and the mark received light quantity level for each color of light emitted by the emitting device;

wherein the difference of the color of light which has the largest ratio is compared to a predetermined value; and wherein when the difference of the color of light which has the largest ratio is below the predetermined level, the selecting device further selects a color of light which has a largest difference from among all of the differences obtained by the first calculation device for emission during the mark detection operation.

3. The photoelectric sensor of claim 1, wherein the first calculation device further obtains a difference between the reference received light quantity level and the mark received light quantity level for each color of light emitted by the emitting device;

wherein the selecting device initially identifies any of the colors of light in which the difference obtained by the first calculation device is at or above a predetermined level; and wherein the selecting device selects the color of light in which the ratio is the largest from among the identified colors of light for emission during the mark detection operation.

4. A photoelectric sensor which includes a light-emitting device for emitting a plurality of different colors of light onto a detection field; and a light-receiving device for receiving light reflected from an object in the detection field, and for receiving light reflected from a mark attached to the object in the detection field; wherein the reflected light is reflected from the light emitted from the light-emitting device, wherein the mark is detected at least in part due to a change in a level of a quantity of light received by the light-receiving device as the emitted light illuminates the mark and the surface of the object not including the mark, the photoelectric sensor comprising:

a reference received light quantity sampling device for sampling a reference received light quantity level for each color of light emitted from the light-emitting device;

wherein the reference received light quantity level is a received light quantity level reflected from the object, other than from the mark, when the object is in the detection field;

a mark received light quantity sampling device for sampling a mark received light quantity level for each color of light emitted from the light-emitting device;

wherein the mark received light quantity level is a received light quantity level reflected from the mark when the mark is in the detection field;

a first calculation device for obtaining a ratio of the reference received light quantity level to the mark received light quantity level, for each color of light emitted from the light-emitting device;

a selecting device for selecting the color of light that has a largest ratio from among all of the ratios obtained by the first calculation device; and wherein the color of light selected by the selecting device is emitted from the light-emitting device during a mark detection operation.

5. The photoelectric sensor of claim 4, wherein the first calculation device further obtains a difference between the reference received light quantity level and the mark received light quantity level for each color of light emitted by the light-emitting device; and wherein the difference of the color of light which has the largest ratio is compared to a predetermined value; and wherein when the difference of the color of light which has the largest ratio is below a predetermined level, the selection device further selects a color of light which has a largest difference from among all of the differences obtained by the first calculation device for emission during the mark detection operation.

6. A photoelectric sensor of claim 4, wherein the first calculation device further obtains a difference between the reference received light quantity level and the mark received light quantity level for each color of light emitted from the light-emitting device;

wherein the selecting device initially identifies any of the colors of light in which the difference obtained by the first calculation device is at or above a predetermined level; and wherein the selecting device selects the color of light in which the ratio is the largest from among the identified colors of light for emission during the mark detecting operation.

7. The photoelectric sensor of claim 1, wherein the object is conveyed through the detection field along a conveying direction and the mark affixed to the object is detected when the object passes through the detection field;

wherein the light-emitting device comprises a single light-emitting element comprising a plurality of LED chips respectively emitting various colors of light;

wherein the LED chips are configured along a row; and wherein the light emitted from the respective LED chips is ultimately irradiated in a direction perpendicular to the conveying direction of the object.

8. A photoelectric sensor including a light-emitting device for individually emitting a plurality of colors of light; a light-receiving device for receiving light reflected from an object or a mark attached to the object present in a detection field; and a sampling device for sampling a received light quantity level of the light received by the light-receiving device for each color of light, wherein a detecting operation is carried out on the basis of the received light quantity level obtained by the sampling device, the photoelectric sensor comprising:

a mode switching device capable of switching an operation mode between a mark detecting mode, for detecting a mark located on the object, and a color detecting mode, for detecting a predetermined color regarding the object present in the detection field, wherein the sampling device includes a reference received light quantity sampling device for sampling a reference received light quantity level for each color of light emitted from the light-emitting device;

wherein the reference received light quantity level is the received light quantity level reflected from a part of the object other than the mark, when the part of the object is present in the detection field;

wherein the sampling device further includes a mark received light quantity sampling device for sampling a mark received light quantity level for each color of light emitted from the light-emitting device when the operation mode has been switched to the mark detecting mode;

wherein the mark received light quantity level is the received light quantity level reflected when the mark is present in the detection field;

a first calculation device for obtaining a ratio of, a difference between the reference received light quantity level and the mark received light quantity level, to one of the reference received light quantity level or the mark received light quantity level, for each color of light emitted from the light-emitting device;

a selecting device for selecting the color of light that has a largest ratio from among all of the ratios obtained by the first calculation device;
   wherein the color of light selected by the selecting device is emitted from the light-emitting device during the mark detecting operation; and a second calculation device for adding together the received light quantity levels of the respective colors of light sampled by the sampling device and obtaining a ratio of, an added received light quantity level, to the received light quantity level of each color of light, when the operation mode has been switched to the color detecting mode,
   wherein each ratio obtained by the second calculation device is compared with a ratio of an added received light quantity level obtained by adding together a received light quantity level of light received during the detecting operation for each color of light, to a received light quantity level of each color of light,
   thereby detecting the color of the object in the detection field when the ratio obtained by the second calculation device is considered equivalent to the ratio of an added received light quantity level during a detecting operation to a received light quantity level corresponding to the detected color.

9. The photoelectric sensor of claim 8, wherein the first calculation device further obtains a difference between the reference received light quantity level and the mark received light quantity level for each color of light emitted by the emitting device; and
   wherein the difference of the color having the largest ratio is compared to a predetermined value; and
   wherein when the difference of the color of light which has the largest ratio is below the predetermined level, the selecting device further selects a color of light which has a largest difference from among all of the differences obtained by the first calculation device for emission during the mark detecting operation.

10. The photoelectric sensor of claim 8, wherein the first calculation device further obtains a difference between the reference received light quantity level and the mark received light quantity level for each color of light emitted by the emitting device; and
   wherein the selecting device initially identifies any of the colors of light in which the difference obtained by the first calculation device is at or above a predetermined level; and
   wherein the selecting device selects the color of light in which the ratio is the largest from among the identified colors of light for emission during the mark detecting operation.

11. A photoelectric sensor including a light-emitting device for emitting light of a plurality of colors one by one; a light-receiving device for receiving light reflected from an object or a mark attached to the object present in a detection field; and a sampling device for sampling a received light quantity level of the light received by the light-receiving device for each color of light, wherein a detecting operation is carried out on the basis of the received light quantity level sampled by the sampling device, the photoelectric sensor comprising:
   a mode switching device capable of switching an operation mode between a mark detecting mode, for detecting a mark on the object, and a color detecting mode, for detecting a predetermined color regarding the object present in the detection field;

wherein the sampling device includes a reference received light quantity sampling device for sampling a reference received light quantity level for each color of light emitted form the light-emitting device;
   wherein the reference received light quantity level is the received light quantity level reflected from a part of the object other than the mark present in the detection field;

wherein the sampling device further includes a mark received light quantity sampling device for sampling a mark received light quantity level for each color of light emitted from the light-emitting device when the operation mode has been switched to the mark detecting mode;
   wherein the mark received light quantity level is the mark received light quantity level reflected from the mark present in the detection field;

a first calculation device for obtaining a ratio of the reference received light quantity level to the mark received light quantity level, for each color of light emitted from the light-emitting device;

a selecting device for selecting the color of light which has a largest ratio from among all of the ratios obtained by the first calculation device,
wherein the color of light selected by the selecting device is emitted from the light-emitting device during a mark detecting operation; and a second calculation device for adding together the received light quantity levels of the respective colors of light sampled by the sampling device and obtaining a ratio of, an added received light quantity level, to the received light quantity level of each color of light, when the operation mode has been switched to the color detecting mode,
   wherein each ratio obtained by the second calculation device is compared with a ratio of added received light quantity level obtained by adding together a received light quantity level of light received during the detecting operation for each color of light, to a received light quantity level of each color of light,
   thereby detecting the color of the object in the detection field when the ratio obtained by the second calculation device is considered equivalent to the ratio of an added received light quantity level during a detecting operation to a received light quantity level corresponding to the detected color.

12. The photoelectric sensor of claim 11, wherein the first calculation device further obtains a difference between the reference received light quantity level and the mark received light quantity level for each color of light emitted by the light-emitting device; and
   wherein the selecting device selects the color of light which has said largest ratio of all the colors of light for which the ratios have been obtained by the first calculation device,
   wherein when the difference of the color having the largest ratio is compared to a predetermined value; and
   wherein when the difference of the color of light having the largest ratio is below a predetermined value, the selecting device further selects a color of light which has a largest difference from among all of the differences obtained by the first calculation device for emission during the mark detecting operation.

13. The photoelectric sensor of claim 11, wherein the first calculation device further obtains the difference between the reference received light quantity level and the mark received light quantity level for each color of light emitted by the light-emitting device;
 wherein the selecting device initially identifies any color of light in which the received light level difference obtained by the first calculation device is at or above a predetermined level; and
 wherein the selecting device selects the color of light in which the ratio is the largest from among the identified colors of light for emission during the mark detecting operation.

14. The photoelectric sensor of claim 8, wherein the object is conveyed in a conveying direction and the mark affixed to the object is detected when the object passes through the detection field;
 wherein the light-emitting device includes a single light-emitting element comprising a plurality of LED chips respectively emitting different colors of light;
 wherein the LED chips are disposed along a row; and
 wherein the light emitted from the respective LED chips is ultimately irradiated in a direction perpendicular to the conveying direction of the object.

* * * * *